(12) United States Patent
Yeomans et al.

(10) Patent No.: US 6,209,297 B1
(45) Date of Patent: Apr. 3, 2001

(54) HEADER FOR A HARVESTER HAVING AN INTEGRAL TRANSPORT SYSTEM

(75) Inventors: Sidney Wayne Yeomans, Milan, IL (US); Bradley James Watts, Eldridge, IA (US); Gordon Lee Salley, Moline, IL (US); Kevin D. Brase, St. Bonifacius, MN (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 09/321,816

(22) Filed: May 28, 1999

(51) Int. Cl.[7] .................................................. A01B 73/00
(52) U.S. Cl. ........................ 56/228; 56/14.9; 56/DIG. 9
(58) Field of Search ........................... 56/228, 365, 366, 56/367, 370, 372, 375, 376, 377, 378, 379, 380, 384, 397, 396, 15.6, DIG. 10, DIG. 27, DIG. 9, 14.9; 172/240, 669; 180/209

(56) References Cited

U.S. PATENT DOCUMENTS

| | | |
|---|---|---|
| 2,833,105 | 5/1958 | Naery . |
| 2,996,307 | 8/1961 | Debailleux . |
| 3,199,889 | 8/1965 | Gadbury . |
| 3,590,928 * | 7/1971 | Mirus ................................. 172/240 |
| 3,610,661 * | 10/1971 | Pierce et al. ...................... 280/415 R |
| 3,659,405 * | 5/1972 | Miller .................................. 56/15.6 |
| 3,683,605 | 8/1972 | Jakobi . |
| 3,721,461 * | 3/1973 | Nelsen et al. ..................... 280/415 R |
| 3,778,987 * | 12/1973 | Rankins ................................. 56/377 |
| 3,910,605 * | 10/1975 | Danford ........................... 280/415 R |
| 3,919,831 * | 11/1975 | Halls et al. ............................ 56/228 |
| 3,962,853 * | 6/1976 | Schwalm et al. ...................... 56/228 |
| 4,119,329 * | 10/1978 | Smith ............................... 280/415 R |
| 4,127,283 * | 11/1978 | Baden ............................... 280/411 R |
| 4,133,402 * | 1/1979 | Soo Hoo ................................ 180/30 |
| 4,223,741 * | 9/1980 | Blumhardt ........................... 172/240 |
| 4,224,783 * | 9/1980 | Kirkpatrick et al. ................. 56/13.5 |
| 4,260,172 * | 4/1981 | Rettig et al. ..................... 280/411 A |
| 4,272,092 * | 6/1981 | Johnson ............................. 280/43.23 |
| 4,308,919 * | 1/1982 | Coughran, Jr. ...................... 172/240 |
| 4,329,833 | 5/1982 | Witzel . |
| 4,360,215 * | 11/1982 | Nohl et al. ........................... 280/413 |
| 4,363,374 * | 12/1982 | Richter et al. ....................... 180/209 |
| 4,384,445 * | 5/1983 | McIlwain ............................... 56/228 |
| 4,409,780 | 10/1983 | Beougher et al. . |
| 4,446,926 * | 5/1984 | Hoaglen ............................. 172/240 |
| 4,569,296 * | 2/1986 | Miller et al. ............................. 111/7 |
| 4,715,172 | 12/1987 | Mosby . |
| 4,903,470 | 2/1990 | Hemker et al. . |
| 5,199,252 * | 4/1993 | Peeters ................................... 56/377 |
| 5,243,810 | 9/1993 | Fox et al. . |
| 5,361,569 | 11/1994 | Schupman et al. . |
| 5,374,082 * | 12/1994 | Smith .................................. 280/789 |
| 5,540,040 * | 7/1996 | Peeters ................................... 56/377 |
| 5,867,970 * | 2/1999 | Ehrhart et al. ........................... 56/6 |
| 5,970,695 * | 8/1998 | Dunn ..................................... 56/228 |
| 6,000,207 * | 6/1998 | Menichetti et al. ................... 56/365 |
| 6,038,844 * | 3/2000 | Peeters et al. ......................... 56/377 |

FOREIGN PATENT DOCUMENTS 2 763782    12/1998   (FR) .

* cited by examiner

Primary Examiner—Robert E. Pezzuto
Assistant Examiner—Arpad Fabian Kovacs

(57) ABSTRACT

An implement for a combine, having an integral transport system with a pair of ground engaging wheels that are moved between transport positions used in transporting the implement and stowed positions on the implement during use of the implement. The wheels may be used as gauge wheels during use to support the ends of the implement. A trailer tongue is retractable and stowed onboard the implement during use, as is a tongue jack. Lights are provided at the end of the implement for visibility during transport. The lights are stowed beneath a cover on the end of the implement to protect the lights from damage during use. All components of the transport system are carried on the implement during use to ensure that they are with the implement when needed to transport the implement. All components are mounted with pins, enabling the implement to be converted between transport and use configurations without the use of hand tools.

25 Claims, 11 Drawing Sheets

HEADER FOR A HARVESTER HAVING AN INTEGRAL TRANSPORT SYSTEM

BACKGROUND OF THE INVENTION

1. Field of the Invention

The present invention relates to an implement, such as header for a combine, that includes an integral transport system to enable the implement to be pulled lengthwise for transport of the implement, and in particular to an implement in which the transport system components are carried onboard the implement when the implement is used in the field.

2. Description of Related Art

To increase harvesting efficiency, harvesters, such as combines, have increased in size and capacity over the years. With this increase in capacity, the detachable header used for picking the crop has increased in width as well. A wider header increases efficiency by reducing the number of passes through the field required by the harvester to cover the entire field. However, the increased width of the header has resulted in transportation difficulties in moving the combine and header from field to field. With a wide header on a combine, it can be difficult to drive the combine on roads, and difficult or even impossible to cross narrow bridges. Vehicle width limitations on public roads may preclude transporting wide headers on the front of a combine.

One solution for the transport problems created by a wide header is to place the header on a trailer and pull the header in a lengthwise direction. This solution has the disadvantage of the added cost and upkeep of the trailer. Another problem is that harvesting may begin at one location in the field with the trailer left there, while the harvesting is completed at another location, or even another field several miles from the trailer.

Another solution for the transport problems created by a wider header is to equip the header with towing equipment, such as wheels and a tongue, enabling the header to be pulled lengthwise on its own wheels for transport. This eliminates the need for a separate trailer. Many such headers have components that are removed from the header and left in the field when harvesting begins. As with a trailer, these components may be several miles away from the combine when they are again needed. Some headers have been equipped with onboard towing equipment, but it is often difficult to change the header between the transport and harvesting configurations. Other headers fold, either upward or forward, to reduce the header width for transport.

SUMMARY OF THE INVENTION

It is an object of the present invention to provide an integral transport system for a combine header in which all components of the transport system are carried onboard the header when the header is configured for harvesting.

It is a feature of the present invention that the header can be reconfigured from harvesting to transport and vice versa quickly and easily, without the use of hand tools.

It is a further feature of the present invention that the two wheels used for towing the header can also be utilized as gauge wheels for the header during harvesting.

The integral transport system of the present invention provides one ground-engaging wheel for towing the header on the rear side of the header coupled to the header frame. A second ground-engaging wheel is mounted to a swing arm that extends downwardly and forwardly from the frame, on the front side of the header beneath the cutterbar. A brace extends downwardly from the frame immediately beneath the cutterbar to hold the swing arm in the transport position. The brace is removably attached to the frame front cross member at the cutterbar. The brace is released from the frame front cross member to enable the swing arm to be rotated to the rear of the header in a stowed position for harvesting. The brace is then attached to the rear of the header frame to hold the swing arm up against the bottom of the header.

For those headers wide enough to require gauge wheels, the two ground engaging wheels are mounted to the header and aligned in the combine travel direction to function as gauge wheels. For those headers that are not equipped with gauge wheels, mounting brackets are provided on the rear of the header to carry the wheels during harvesting.

A trailer tongue is retractably stored along the bottom of the header. The tongue can be extended from one end of the header and locked in place by pins for transport. A tongue jack is removably attached to the tongue to support the extended tongue above the ground. The jack is removed from the tongue for harvesting and mounted to a bracket on the rear of the header.

The end of the header opposite from the trailer tongue is equipped with a pair of light bars. The light bars have a stowed position within an end sheet cover, where the lights are protected from damage during harvesting. The end sheet cover is removed to access the light bars and to move the light bars to transport positions in which they extend from the header to indicate the full width of the header during transport. In addition, a slow moving vehicle sign is rotated from a stowed position beneath the end sheet cover to a visible transport position. The end sheet cover is then reinstalled for transport.

All of the moving components of the transport system are locked in place by retaining pins, enabling the header to be converted between transport and harvesting configurations without the need for hand tools to manipulate fasteners.

DESCRIPTION OF THE PREFERRED EMBODIMENT

Figure 1:
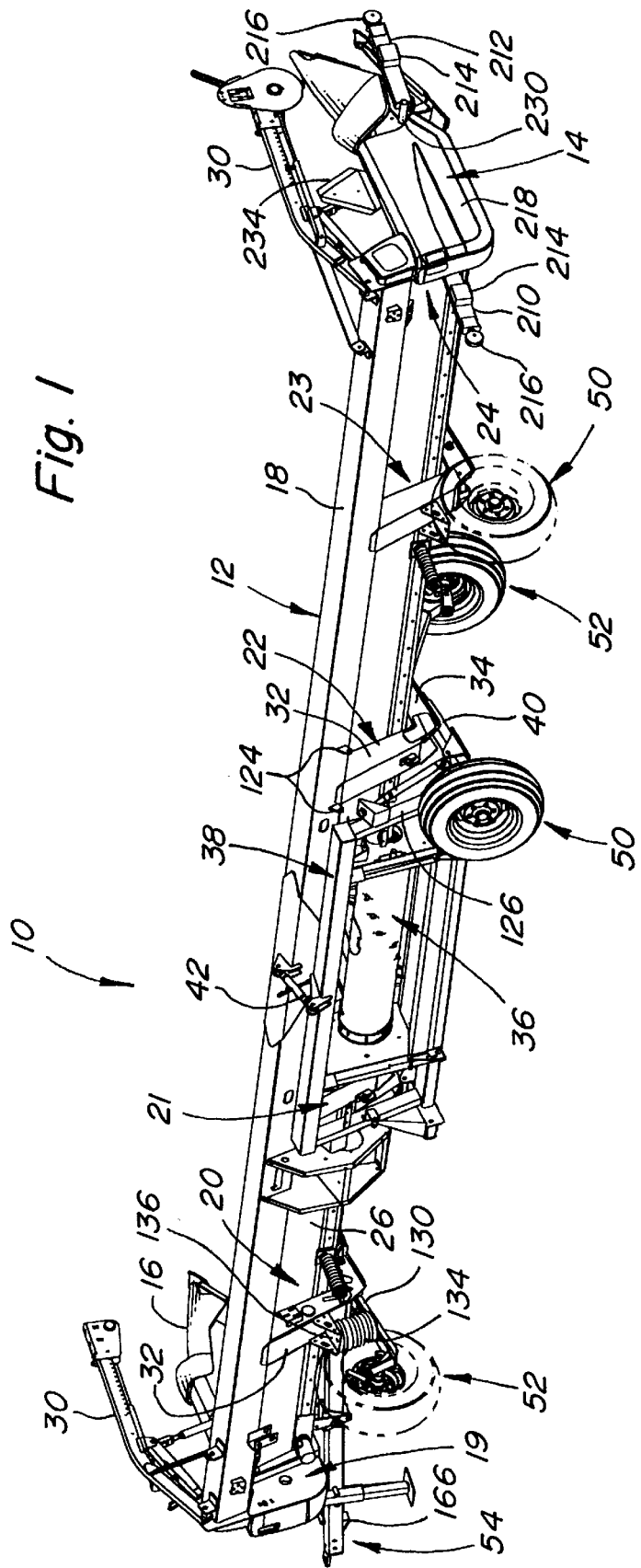
FIG. 1 is a perspective view of the header of the present invention having an integral transport system shown in a transport configuration.

With reference to FIG. 1, a header for a combine having the integral transport system of the present invention is shown and designated generally at 10. The header 10 includes a main frame 12 that extends laterally between opposite ends 14 and 16. The main frame 12 includes an upper beam 18 that extends between the opposite ends 14 and 16, a plurality of support arms 19, 20, 21, 22, 23, 24 that extend downward and forward from the upper beam, and a front cross member 25 (FIG. 4) welded to the support arms at a front edge of the header. The header 10 includes a rear wall 26 and a cutterbar 28 is disposed along the front cross member 25 for cutting a standing crop. A reel, not shown, is supported on a pair of reel support arms 30 at the two ends 14, 16 in a conventional manner.

The interior support arms 20, 21, 22, 23 of the main frame include an upright rear portion 32 behind the rear wall 26 and a bottom portion 34 extending forward from the lower end of the upright rear portion 32 to the front cross member 25. The rear wall 26 includes an opening 36 for receiving cut crop material to move this material rearwardly into the feederhouse of a conventional combine (not shown).

An attachment frame 38 is used to mount the header to a combine feederhouse. The attachment frame 38 includes forward extending leaf springs 40, only one of which is shown, that are attached to the bottom portion of two of the support arms 21, 22, to provide a suspension between the main frame 12 and the attachment frame 38. A tumbuckle 42 couples the upper beam 18 of the main frame to the attachment frame 38. The attachment frame 38 is rigidly coupled to the combine feederhouse in a conventional manner.

Figure 2:
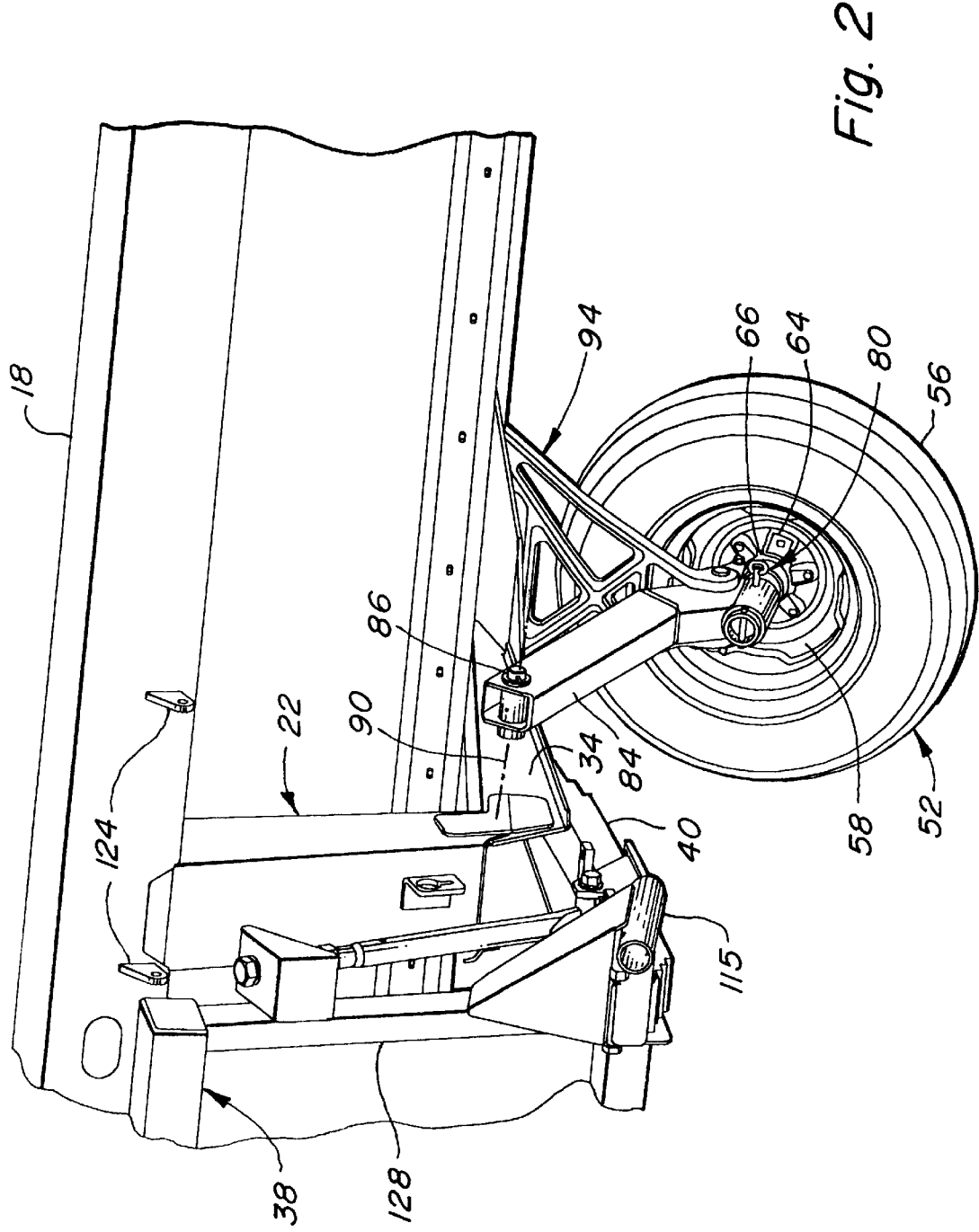
FIG. 2 is a rear perspective view of one of the ground engaging wheels shown in the transport position.

Because of the width of the header 10, the header is provided with a transport system to enable the header 10 to be towed in a lengthwise direction. The transport system includes a pair of ground engaging tire and wheel assemblies, each including an inflatable tire 56 and a metal wheel 58 (FIG. 2). The tire and wheel assemblies will be referred to herein as "wheels" and it will be understood that the term "wheel" refers to both the inflatable tire and the metal wheel. One ground engaging wheel 50 is mounted along the rear side of the header while another ground engaging wheel 52 is mounted along the front edge of the header. The wheels 50, 52 support the header both fore and aft of the header center of gravity. A retractable trailer tongue 54 is provided at one end of the header for attaching the header to a towing vehicle. Depending on the width of the header, the ground engaging wheels 50 and 52 may also be used as gauge wheels, as shown in phantom line, on each side of the header during harvesting.

Figure 3:
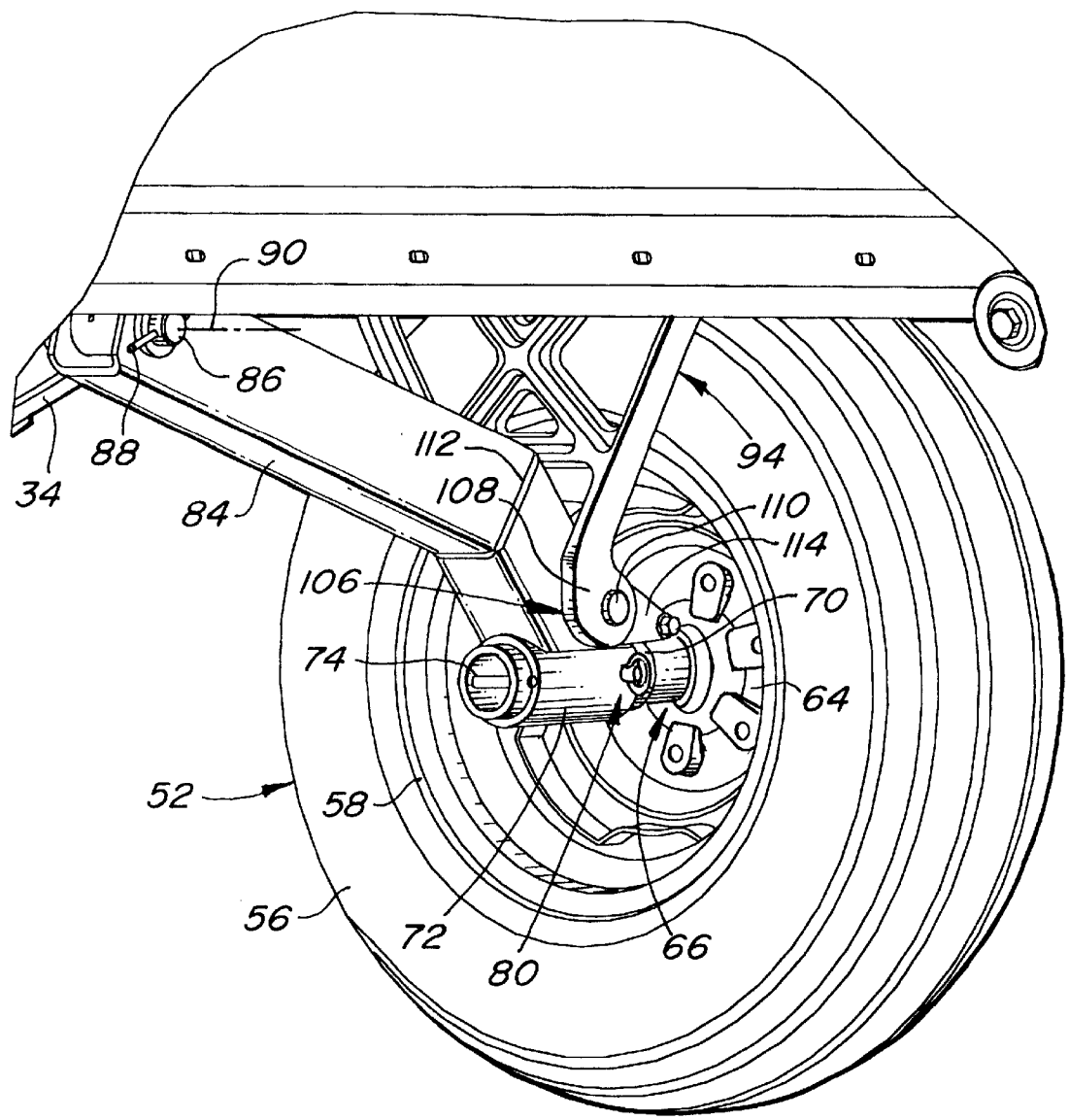
FIG. 3 is an rear perspective view of the ground engaging wheel shown in FIG. 2.
Figure 4:
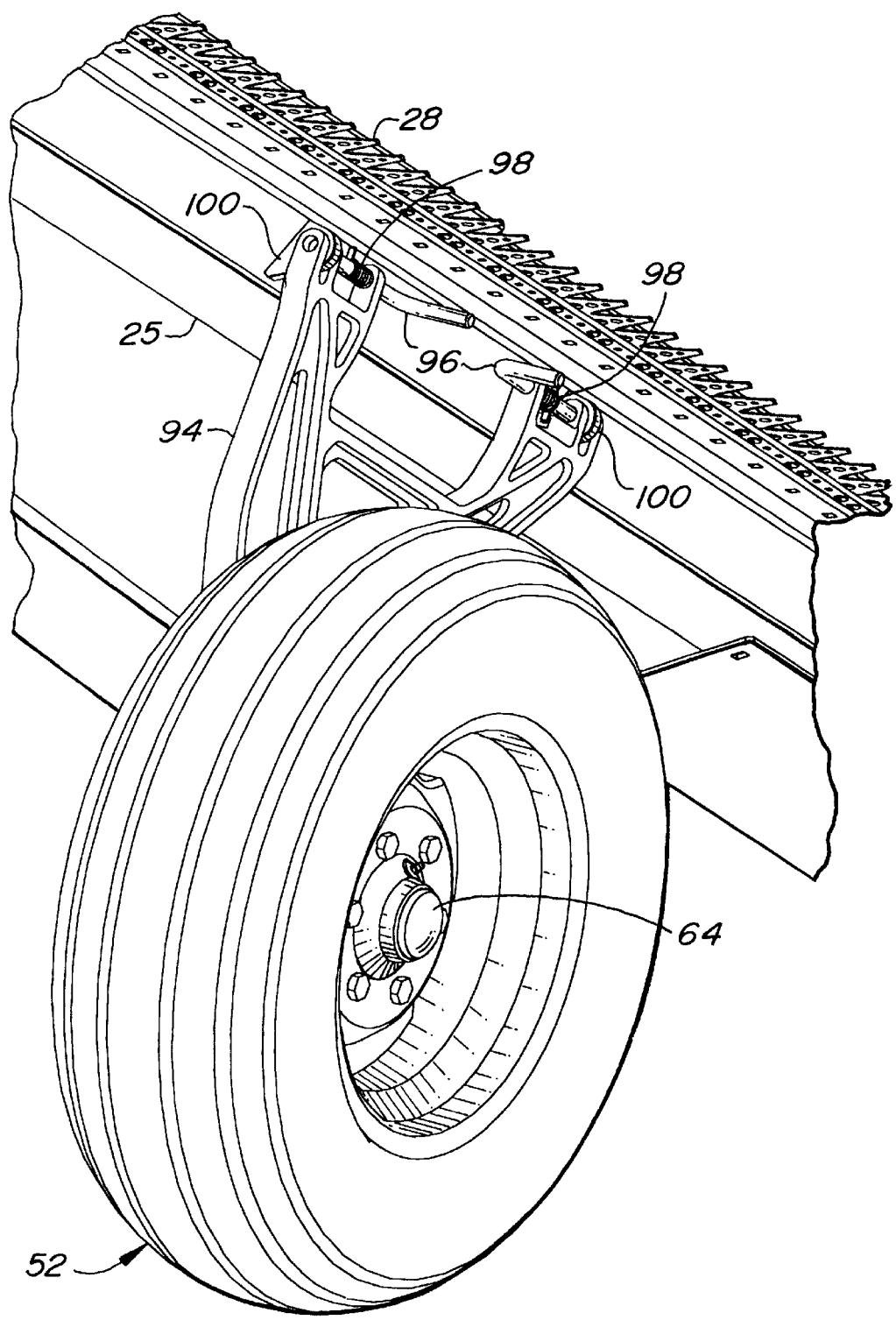
FIG. 4 is a front perspective view of the ground engaging wheel shown in FIG. 2.

With reference to FIGS. 2, 3 and 4, the mounting of the front wheel 52 in the transport position is shown. The wheel 52 is mounted to a hub 64. The hub 64 is rotatably carried on a spindle 66 by a bearing assembly (not shown) in a conventional manner for mounting a rotating wheel. The spindle 66 is inserted into a spindle receiver 70, in the form of a hollow tube. The spindle receiver 70 is rotatably mounted inside a sleeve 72. The spindle receiver 70 is retained in the sleeve 72 by a transverse pin 74 passing through the spindle receiver 70 at one end of the sleeve and a transverse tube 78 (FIG. 5) welded to the spindle receiver 70 at the opposite end of the sleeve 72. The tube 78 and pin 74 capture the spindle receiver 70 within the sleeve 72.

In the transport position shown in FIG. 3, a pin 80 passes through the sleeve 72, the spindle receiver 70 and the spindle 66. The pin 80 thus retains the spindle 66 within the spindle receiver 70 and also prevents rotation of the spindle and spindle receiver within the sleeve 72.

The sleeve 72 is welded to the end of a swing arm 84. The swing arm 84 is coupled to the bottom portion 34 of the support arm 22. The swing arm is mounted on a pivot pin 86, held in place by a retaining pin 88. The swing arm 84 is rotatable about the axis 90 of the pivot pin 86. The axis 90 extends transverse to the direction of header travel during harvesting.

Figure 5:
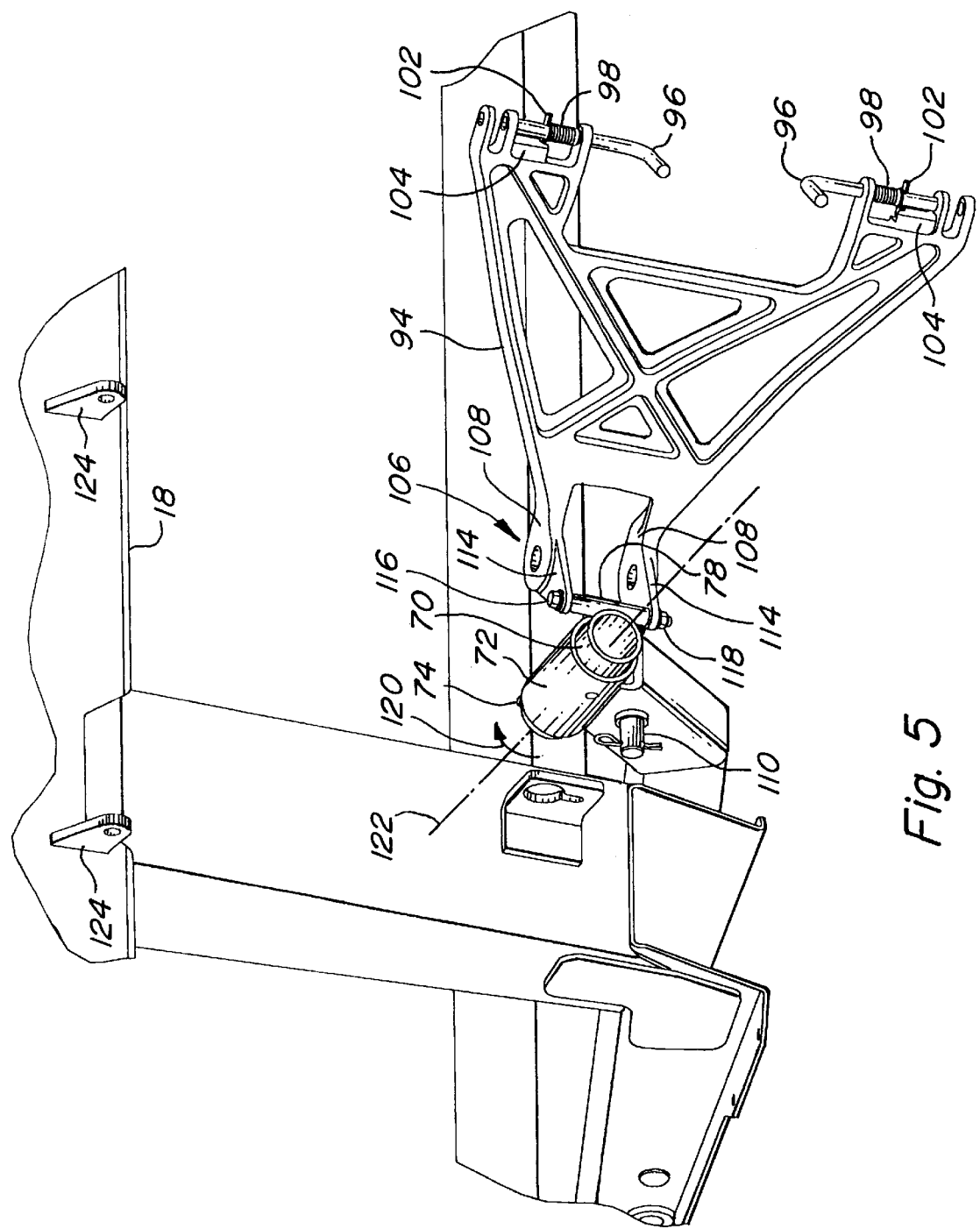
FIG. 5 is a rear perspective view of the support structure for a front wheel illustrating the conversion of the support structure from transport and harvesting configurations.

In the transport position, the swing arm 84 extends downwardly and forward from the pivot pin 86. The swing arm is maintained in this position by a brace 94. The brace 94 is removably attached to the front cross member 25 by a pair of mounting pins 96 biased by springs 98. The pins 96 extend through apertures in flanges 100 welded to the front cross member 25. The mounting pins 96 can be retained in positions withdrawn from the flanges 100 by cross pins 102 that retain the springs 98. These cross pins are seated against blocks 104 cast into the end of the brace 94 to hold the mounting pins 96 in retracted positions as shown in FIG. 5. This facilitates movement of the brace between the stowed and transport positions, allowing the brace to be placed in position without the need to manually hold the mounting pins 96 in retracted positions. The lower end 106 of the brace is forked, having two flanges 108 that are placed on opposite sides of the swing arm 84 as shown in FIG. 3. The lower end 106 of the brace 94 is coupled to the swing arm 84 by a pin 110, extending through both the brace flanges 108 and the swing arm 84. In the transport position with the brace 94 coupled to the front cross member 25 and the swing arm 84, the brace 94 supports the swing arm 84 and prevents rotation of a swing arm about the pivot pin 86.

In the preferred embodiment, the swing arm 84 is a weldment constructed of tube sections welded together at the joint 112. The brace 94 is an iron casting. Secondary flanges 114 extend from the end 106 of the brace 94 and are positioned on opposite ends of the tube 78 that is welded to the spindle receiver 70. A pivot bolt 116 extends through the flanges 114 and the tube 78 and is retained by a nut 118.

The header is converted from transport to harvesting configurations by first raising the header and removing the wheel 52. The wheel 52 is removed by withdrawing the pin 80, enabling the spindle 66 to be withdrawn from the spindle receiver 70. With the wheel 52 removed, the upper end of the brace 94 is uncoupled from the front cross member 25. This enables the swing arm 84 to rotate about the pivot pin 86 downward and rearward such that it extends rearward from the pin 86 along the bottom portion 34 of the support arm 20. The pin 110 that couples the brace end 106 to the swing arm is removed from the brace 94 and swing arm 84. The brace 94 is rotated about the pivot bolt 116 in the tube 78 to withdraw the flanges 108 from the opposite sides of the swing arm 84. Once the flanges 108 have cleared the swing arm, the brace 94 and the spindle receiver 70 are rotated about the axis 122 of the sleeve 72 as shown by the arrow 120 in FIG. 5. An intermediate position of the brace 94 is shown in FIG. 5, after approximately 90° of rotation of the brace and spindle receiver about the sleeve axis 122.

Figure 6:
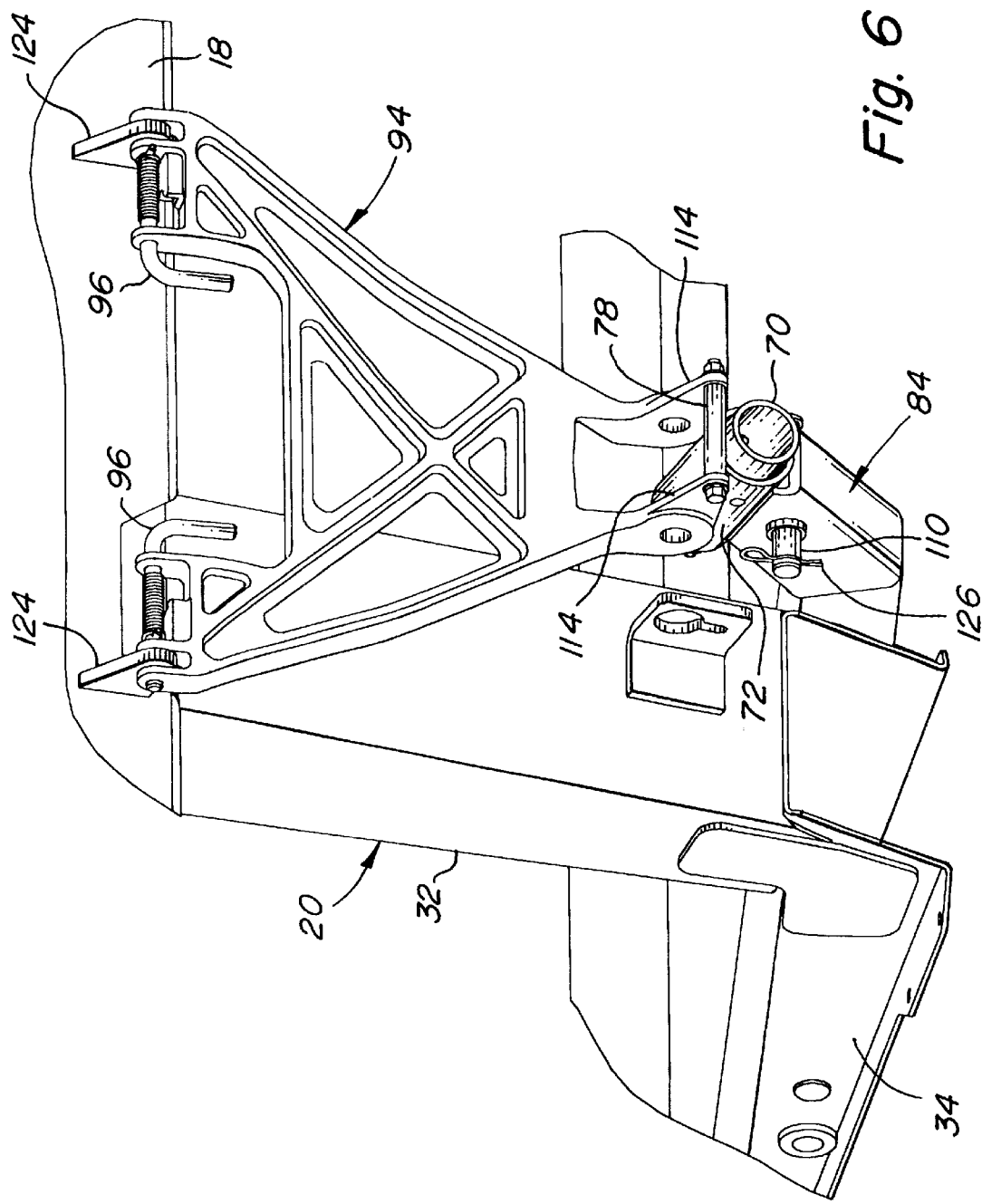
FIG. 6 is a rear perspective view of the support structure for the front wheel illustrating the stowed position for harvesting of the header.

FIG. 6 illustrates the swing arm 84 and brace 94 in stowed positions for harvesting. The upper end of the brace 94 is secured to mounting flanges 124 projecting from the upper beam 18 in the same manner in which the brace is secured to the front cross member 25 in the transport position. Retention of the brace 94 to the upper beam 18 secures the swing arm 84 in its stowed position in which it extends rearward, adjacent to the bottom portion 34 of the support arm 22. The pin 110 is inserted in the swing arm 84 and held in place by the retaining pin 126 to store the pin 110 during harvesting of the header. The swing arm 84, in the stowed position does, not extend downward from the header frame, but is positioned alongside the bottom portion of the support arm 22. Thus, the swing arm 84 does not affect the ground clearance of the header 10. As shown and described, the swing arm is also moved between the stowed and transport positions by manipulation of pins, without the need for hand tools.

The rear wheel 50 is mounted to a wheel hub 64 and spindle 66 as described above in connection with the wheel 52. The wheel 50 is mounted to a spindle receiver 115 (FIG. 2) fixed to the upright member 128 of the attachment frame 38. The wheel 50 is retained in the spindle receiver 115 by a pin in the same manner at the wheel 52. The location of the spindle receiver 115 on the attachment frame and its orientation is such that it is substantially aligned with the axis of the spindle receiver 70 along the front edge of the header for the wheel 52. The wheels 50, 52 are thus closely aligned with one another.

Figure 7:
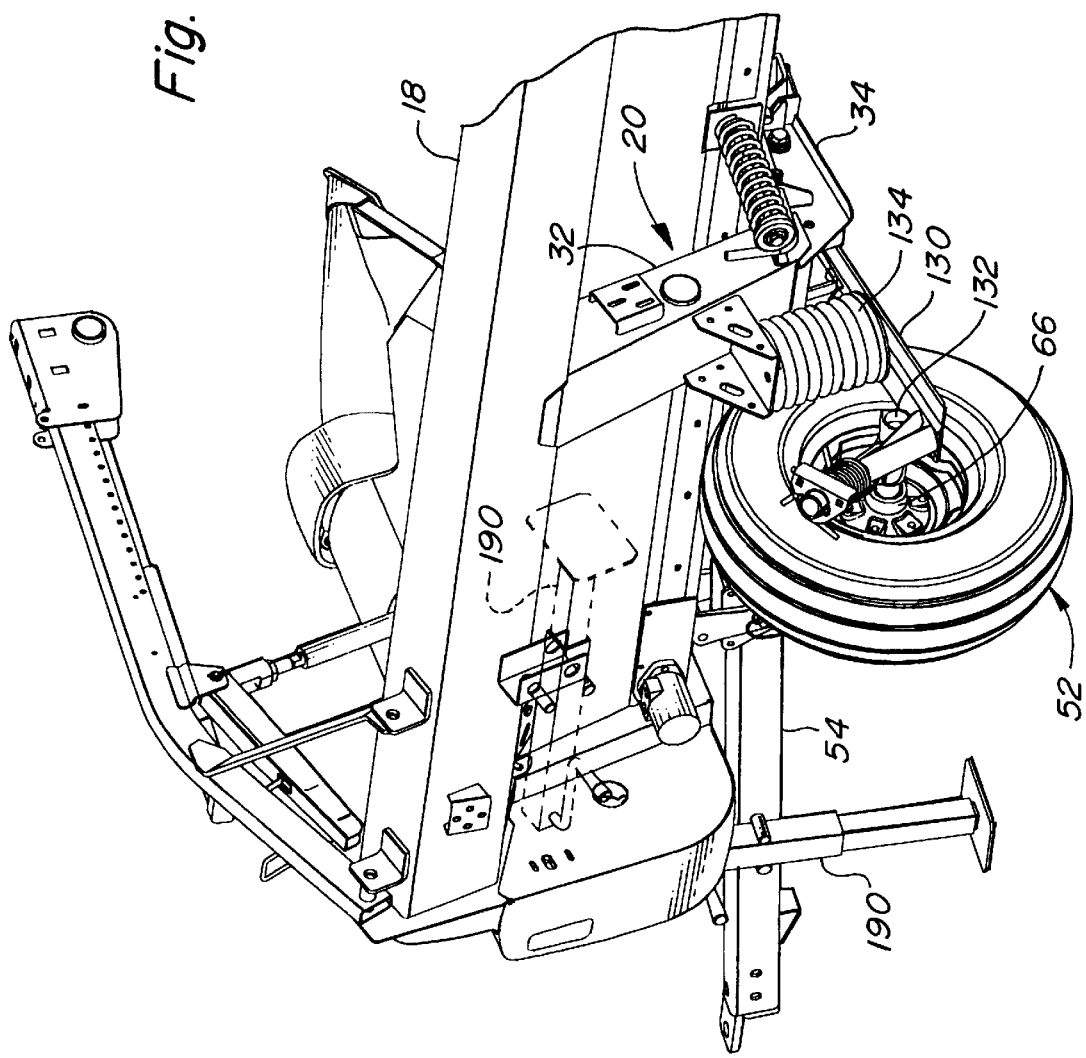
FIG. 7 is a rear perspective view of the header of the present invention illustrating the gauge wheel mounting on one side of the header.

When the wheels 50 and 52 are removed from their transport positions, they are mounted to the upper beam 18 in a storage position (not shown) or used as gauge wheels as follows. For use as gauge wheels, the wheels 50, 52 are pivot carried by the support arms 20 and 23 to support the ends of the header during harvesting. With reference to FIG. 7, the coupling of the wheel 52 to the support arm 20 in a gauge wheel position is shown. An arm 130 extends rearward from the bottom portion of the support arm 20. The rearward end of the arm 130 supports a spindle receiver 132 like the spindle receiver 70 and receives the spindle 66 to mount the wheel 52. The arm 130 is rotatably mounted to the support arm 20 and is supported by an inflatable airbag suspension member 134, positioned between the arm 130 and a support bracket 136 fixed to the support arm 20. The airbag 134 provides an air-cushioned suspension to the gauge wheel 52. Another gauge wheel mounting structure is provided on the support arm 23 to support the other wheel 50 in a gauge wheel position for harvesting.

Whether the wheels 50, 52 are carried on the upper beam 18 or used as gauge wheels during harvesting, the wheels remain with the header, and are thereby available when the harvesting is completed and it is again necessary to transport the header 10.

Figure 8:
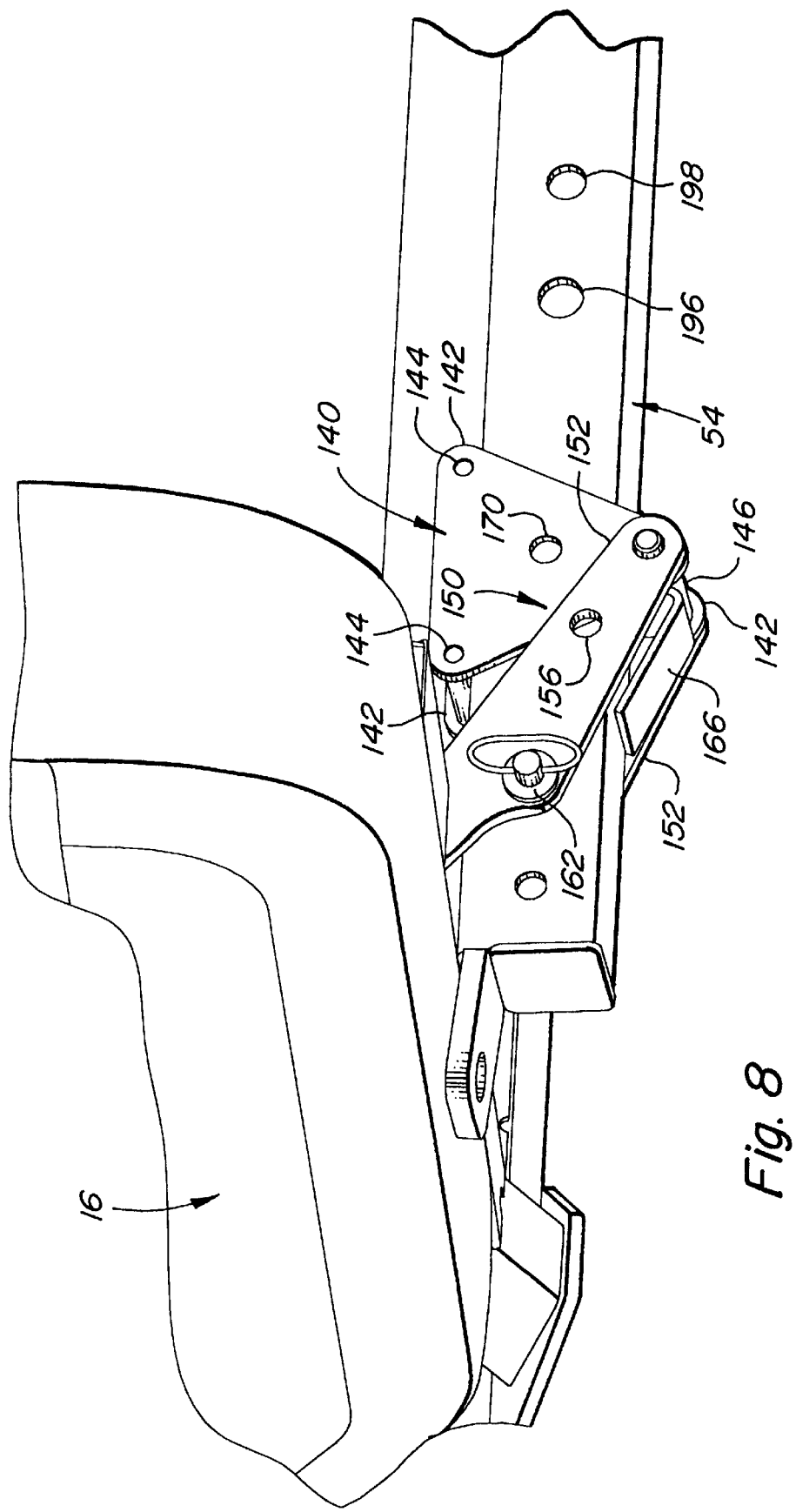
FIGS. 8 and 9 are perspective views showing the trailer tongue in the retracted, stowed position and extended trailer position respectively.

The header also includes a retractable trailer tongue 54 for towing the header in a lengthwise direction. The tongue 54 is carried by the main frame for movement between a retracted, stowed position shown in FIG. 8, and an extended transport position shown in FIGS. 1 and 9. As seen in FIG. 1, the tongue extends from the end 16 of the header. The tongue 54 is a tubular member and is movable in a cradle 140. The cradle is formed of a pair of identically shaped triangular plates 142 spaced apart by pins 144 at the two upper corners of the plates 142 and by a pivot pin 146 at the lower corner of the plates 142. The tongue 54 slides in the cradle 140 between the pivot pin 146 and the two upper pins 144.

The cradle 140 is in turn mounted to a pivot arm 150 formed by spaced plates 152 positioned outside the plates 142 of the cradle 140. The pivot arm 150 is pivotally mounted to the support arm 19 by a pin 154 shown in FIG. 9. The pivot arm 150 has a pair of apertures, a lower aperture 156 shown in FIG. 8 and an upper aperture 158 shown in FIG. 9. In the retracted, stowed position of the tongue, a pin 162 extends through the upper aperture 158 in the pivot arm and through the aperture 164 in the tongue, near the distal end of the tongue, to secure the tongue to the pivot arm 150.

The tongue 54 has an abutment plate 166 that extends downward below the lower surface of the tongue. When the tongue is slid to the retracted, stowed position, the plate 166 engages the pin 146, causing the pivot arm 150 to rotate inwardly and upwardly to raise the tongue 54. When the aperture 158 in the pivot arm and the aperture 164 in the tongue are aligned, the pin 162 is inserted therethrough to retain the tongue 54 in the retracted, stowed position. In this raised position, the tongue 54 is held against the bottom portions 34 of the support arms 19, 20.

Figure 9:
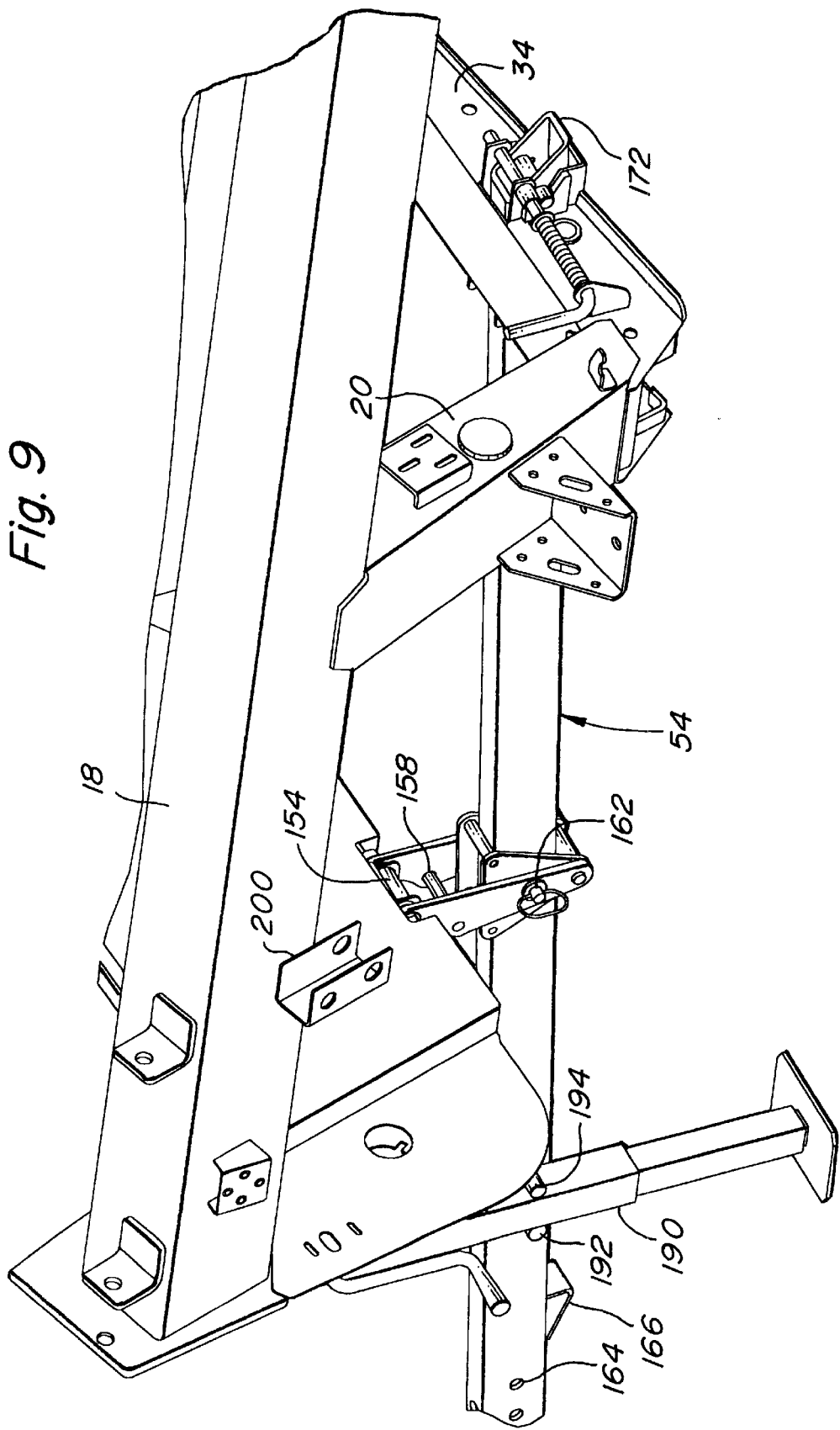
Figure 10:
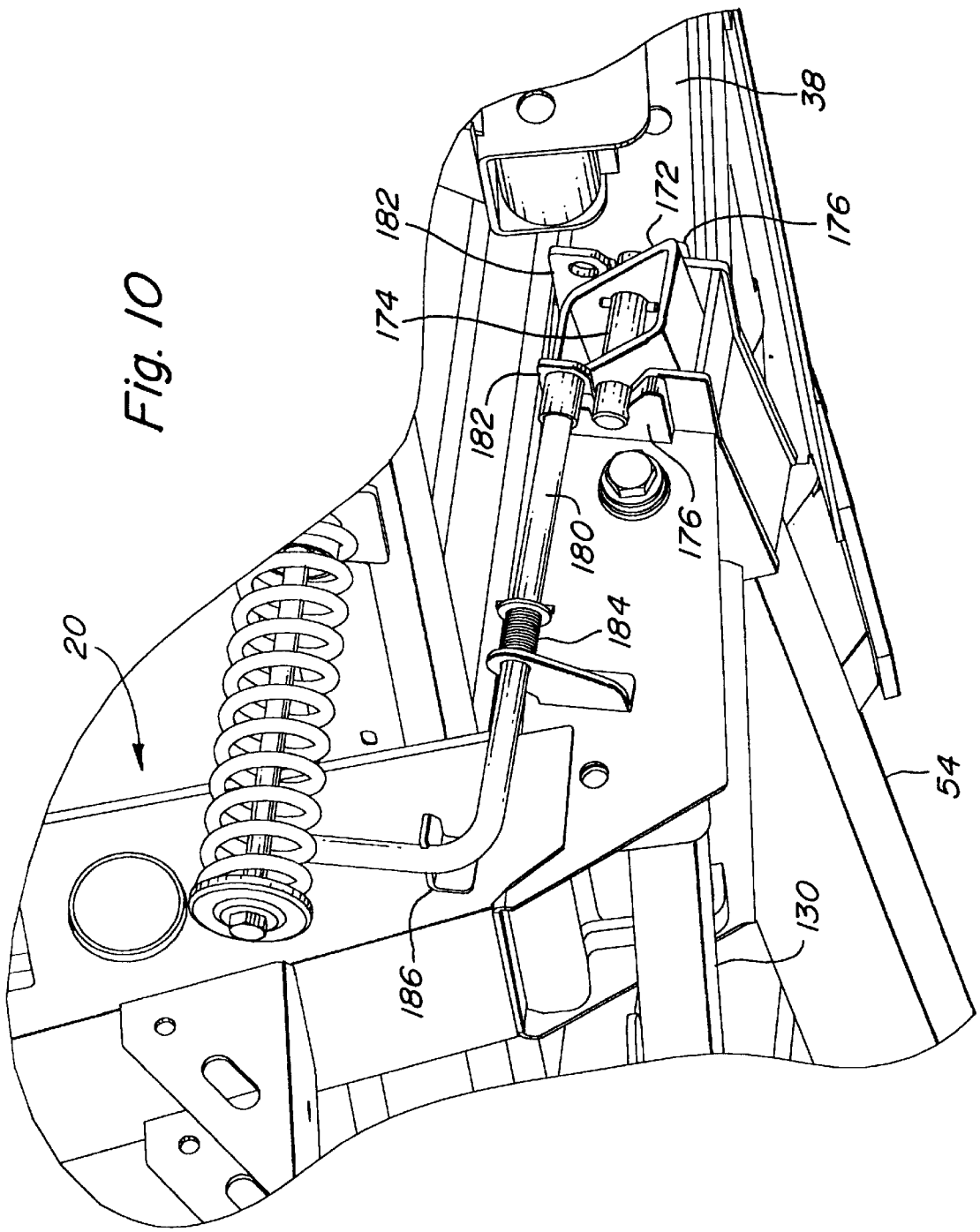
FIG. 10 is an enlarged perspective view of the inboard end of the trailer tongue in the extended towing position.
Figure 11:
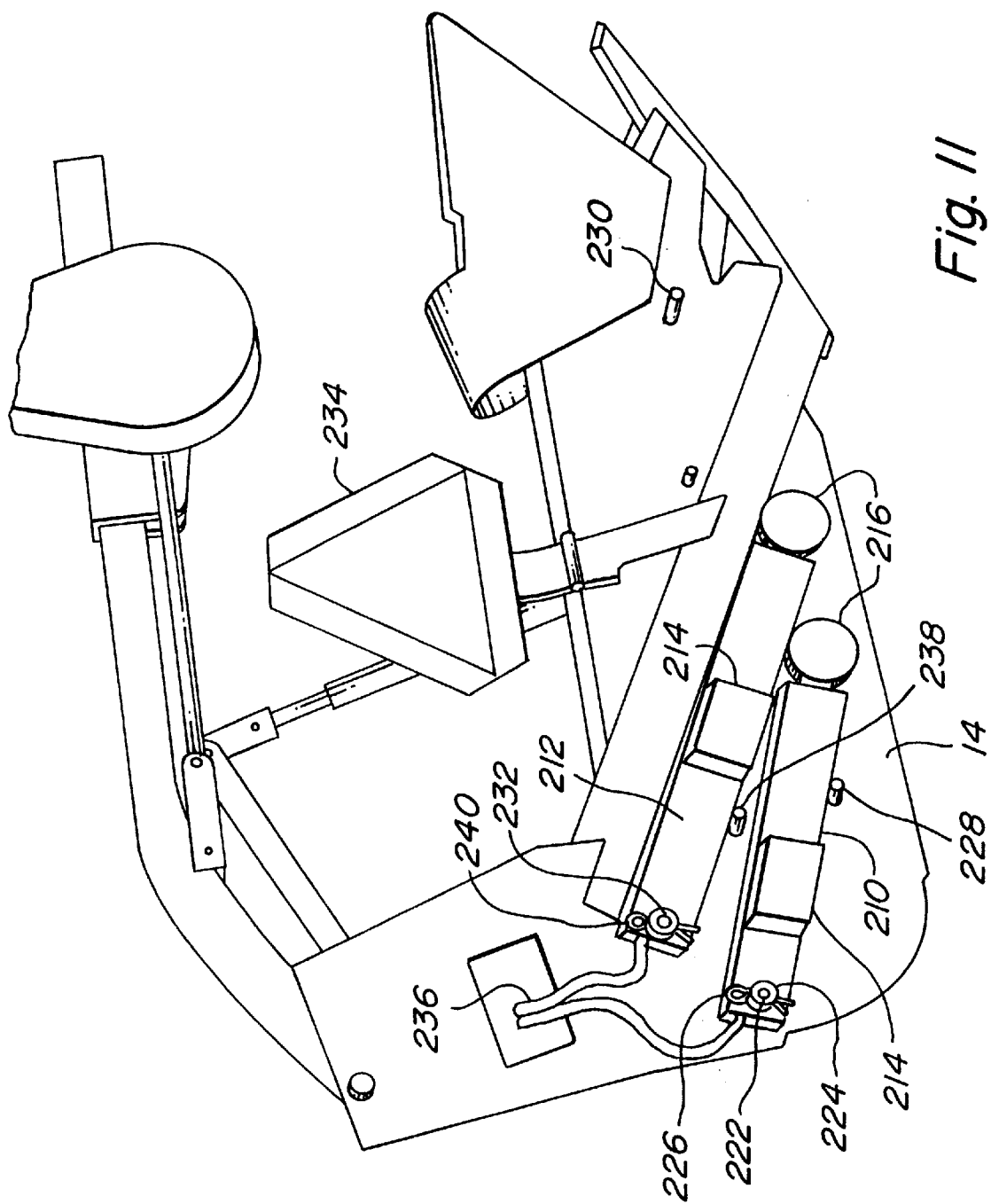
FIG. 11 is an end view of the header illustrating the light bars of the transport system in stowed positions.

The tongue 54 is shown in an extended towing position in FIG. 9. In this position, the pivot arm 150 is lowered and the pin 162 is inserted through the lower aperture 156 in the pivot arm, through the center aperture 170 in the cradle 140 and through an aperture in the tongue 54. This locks the pivot arm, cradle and tongue together. In the extended position, the end 172 of the tongue 54 is adjacent the bottom portion 34 of the support arm 20 as best illustrated in FIG. 10. Further extension of a tongue 54 is prevented by a cross pin 174 carried by the tongue. The cross pin 174 seats in "V" shaped plates 176 extending transversely from the bottom portion 34 of the support arm 20. A spring biased locking pin 180 is movable across the end 172 of the tongue and retained in plates 182 on each side of the tongue. This prevents the tongue from moving inward, toward the retracted position during transport of the header. The locking pin 180 is biased by a spring 184 into the locked position in the two plates 182. A hook retaining plate 186 is provided on the support arm 20 to hold the pin 180 in an open position when the tongue 54 is moved inward to its retracted, stowed position.

Pins 192, 194 (FIG. 9) removably mount a tongue jack 190 to the tongue 54. The pins 192, 194 are inserted through the apertures 196, 198 (FIG. 8) in the tongue respectively. The pins 192 and 194 are of different diameter as are the apertures 196, 198 to ensure that the jack stand 190 is mounted on the proper side of the tongue 54. When the header 10 is harvesting, the jack stand 190 is mounted to a bracket 200 (FIG. 9) welded to the upper beam 18. The bracket 200 has a pair of apertures, identical to the apertures 196, 198 in the tongue, for mounting the jack 190 thereto. By storing the tongue 54 and jack 190 on board the header during harvesting, these components will remain with the header and be available when the header is once again converted to the transport configuration.

With reference once again to FIG. 1, the header 10 is shown with lights mounted to the header end 14, opposite the tongue 54. Light bars 210 and 212 extend fore and aft from the header. Each light bar carries one or more lights, such as lights 214 and 216. The lights define the width of the header, as it is pulled lengthwise. The light bars 210 and 212 are movable from the extended position shown in FIG. 1, to stowed positions beneath the cover 218 of the header end sheet. To move the light bars to their stowed positions, the cover 218 is first removed. The light bar 210 is carried on a post 222 and has a tube 224 surrounding the post 222. A spring locking pin 226 holds the bar 210 in a fixed position on the post 222. With the cover 218 removed, and the spring locking pin 226 removed, the light bar 210 is moved outward toward the end of the post 222 and rotated approximately 180° to the stowed position resting on a stop 228. The spring locking pin 226 is again inserted through the post 222 and the tube 224 of the light bar to retain the light bar 210 in the stowed position.

The light bar 212 is similarly mounted to a post 230. The light bar 212 is removed from the post 230 and remounted to a second post 232 such that the bar 212 is stowed adjacent to the light bar 210 and on a stop 238. The light bar 212 is retained in place on the posts by a spring locking pin 240. The slow moving vehicle sign 234 is also rotated downward over the two light bars 210, 212 without the use of hand tools. The cover 218 is then returned to a position covering the light bars and the slow moving vehicle sign during harvesting. The cover 218 protects the lights from damage during harvesting. The light bars are electrically connected through a wiring harness 236 that extends the length of the header 10 and is coupled to a towing vehicle to provide electrical power to the lights in a known manner.

The components of the transport system of the present invention are completely stored on board the header when the header is harvesting. The header can be converted between transport and harvesting configurations without the use of hand tools. The swing arm 84 and brace 94 are the only wheel supporting members that need to be moved between transport and harvest positions, resulting in a header that has a minimal number of components to be moved and reconfigured between transport and harvesting configurations.

The transport system of the present invention has been described and shown in the context of a header for a combine. The transport system can, however, be used in other implements that have a great width during field use. Planters and tillage implements are two examples of wide implements for which special provisions are needed for transport of the implement on a road. The integral transport system of the present invention can be integrated into these, and other implements, without departing from the scope of the present invention.

The invention should not be limited to the above-described embodiment, but should be limited solely by the claims that follow.

What is claimed is:

1. A header for attachment to a harvester comprising:
    a main frame forming a structure having an upright rear portion forming a rear side of the header and a bottom portion extending forward from a lower end of the upright rear portion and terminating in a front edge of the header, the main frame extending longitudinally between opposite ends of the header transverse to an operating direction of travel of of the header in which the front edge of the header leads;
    front and rear ground engaging wheels, each wheel being removably mounted to the header in a transport position in which the wheels are aligned with the longitudinal length of the header for lengthwise towing of the header transverse to the operating direction of travel of the header, each wheel being rotatable upon a spindle and the front wheel being positioned along the front edge of the header and the rear wheel being positioned along the rear side of the header;
    a front transport wheel spindle receiver for removably mounting the front wheel in the transport position along the front edge of the header and a rear transport wheel spindle receiver for removably mounting the rear wheel in the transport position on the rear side of the header;
    the front transport wheel spindle receiver being mounted to a distal end of a swing arm that is rotatably coupled to the main frame for movement between a first transport position and a second stowed position, in the transport position, the swing arm locates the spindle receiver along the front edge of the header for mounting of the front wheel thereto; and
    a brace coupled to the distal end of the swing arm to hold the swing arm in both the first transport position and the second stowed position, the brace being removably coupled to the frame at a first transport location to hold the swing arm in its first transport position and the brace being removably coupled to the frame at a second stowed location to hold the swing arm in its second stowed position whereby the brace and swing arm can be selectively moved between transport and stowed positions.

2. The header as defined by claim 1 further comprising an attachment frame coupled to the main frame the attachment frame being adapted to mount the header to a harvester and wherein the rear transport wheel spindle receiver is carried by the attachment frame.

3. The header as defined by claim 1 wherein the swing arm rotates about a generally horizontal axis extending transverse to the header operating travel of direction when the swing arm is moved between the transport and stowed positions.

4. The header as defined by claim 1 wherein the main frame includes an upper beam extending longitudinally between the opposite ends of the header at an upper end of the upright rear portion of the main frame, a front cross member extending longitudinally between the opposite ends of the header at the front edge and a plurality of support arms connected to and extending between the upper beam and the front cross member, the support arms each having an upright rear portion and a forwardly extending bottom portion.

5. The header as defined by claim 4 wherein the swing arm is rotatably coupled to the forwardly extending bottom portion of one of the support arms.

6. The header as defined by claim 4 wherein the brace is coupled to the upper beam in the stowed position and wherein the brace is coupled to the front cross member in the transport position.

7. The header as defined by claim 4 further comprising an elongated trailer tongue carried by the bottom portion of one or more of the support arms for movement between a retracted, stowed position and a transport position in which a portion of the trailer tongue extends outward beyond one end of the frame for attachment to a towing vehicle.

8. The header as defined by claim 7 further comprising a pivot arm carried by an outboard support arm to support the trailer tongue, the pivot arm having a stowed position and a lowered transport position to lower the tongue beneath the support arms of the main frame in the transport position.

9. The header as defined by claim 8 further comprising a cradle mounted to the pivot arm and surrounding the trailer tongue and through which the trailer tongue slides between the stowed and transport positions to raise and lower the pivot arm as the trailer tongue is moved between the stowed and transport positions.

10. The header as defined by claim 1 further comprising an elongated trailer tongue carried by the main frame bottom portion for movement between a retracted, stowed position and a transport position in which a portion of the tongue extends outward beyond one end of the frame for attachment to a towing vehicle.

11. The header as defined by claim 10 further comprising a tongue jack having a transport position coupled to the trailer tongue when the trailer tongue is in the transport position and a stowed position removably mounted to the main frame.

12. The header as defined by claim 11 wherein the tongue jack is mounted to the trailer tongue and to the main frame by at least one pin.

13. The header as defined by claim 1 wherein the distal end of the swing arm includes a sleeve with the spindle receiver mounted therein for rotation of the spindle receiver about a sleeve axis, the spindle receiver being coupled to the brace for rotation of the brace and the spindle receiver about the sleeve axis, and further comprising a pin to fix the brace to the swing arm in the transport position to prevent rotation of the brace and the spindle receiver about the sleeve axis.

14. The header as defined by claim 13 wherein the pin between the brace and the swing arm is removed to move the brace and the swing arm from the transport position to the stowed position.

15. The header as defined by claim 1 wherein each of the ground engaging wheels is held in the respective spindle receiver by a pin extending through the spindle receiver and the spindle associated with each wheel wherein the spindle is retained in the spindle receiver and prevented from rotation therein and wherein the spindles are removed from the spindle receivers by withdrawing the pins.

16. The header as defined by claim 1 wherein the ground engaging wheels are held in the respective spindle receivers by pins and the brace is coupled to the main frame in both the transport and stowed positions by pins whereby the wheels can be removed and the swing arm moved between the stowed and transport positions without the use of tools.

17. The header as defined by claim 16 further comprising an elongated trailer tongue carried by the main frame for movement between a retracted, stowed position and a transport position in which a portion of the tongue extends outward beyond one end of the frame for attachment to a towing vehicle and one or more pins holding the trailer tongue in the retracted, stowed position and the transport position.

18. The header as defined by claim 1 further comprising gauge wheel mounts on the main frame for mounting the ground engaging wheels to the main frame aligned with the operating direction of travel of the header to support the header upon the ground, the gauge wheel mounts each including a spindle receiver for mounting the wheels.

19. The header as defined by claim 18 further comprising pins for mounting the wheels in the spindle receivers of the gauge wheel mounts.

20. The header as defined by claim 1 further comprising first and second light bars mounted to the main frame at one end thereof, the light bars having transport positions in which one bar extends forward and the other bar extends rearward from the main frame in the operating direction of travel of the header to identify the width of the header during lengthwise transport and wherein the bars have stowed positions in which the bars do not extend from the main frame.

21. The header as defined by claim 20 further comprising a cover on the end of the main frame to conceal the light bars when in the stowed positions to protect the lights from damage during harvesting.

22. The header as defined by claim 20 further comprising pins to retain the light bars in the stowed and transport positions whereby the light bars can be moved between the stowed and transport positions without the use of tools.

23. A header for attachment to a harvester comprising:
 a main frame extending longitudinally between opposite ends of the header transverse to an operating direction of travel of of the header;
 first and second ground engaging wheels, each wheel being removably mounted to the header in a transport position in which the wheels are aligned with the longitudinal length of the header for lengthwise towing of the header, each wheel further having a second position removably mounted to the header for harvesting of the header;
 one or more pins for coupling each wheel to the header in the transport and second positions wherein the wheels can be moved between the transport and second positions without the use of tools; and
 at least one light bar mounted to the main frame at one end thereof, the light bar having a transport position in which the light bar extends from the main frame in the operating direction of travel of the header to identify the width of the header during lengthwise transport and wherein the light bar has a stowed position in which the light bar does not extend from the main frame, the light bar being retained in the transport and harvest positions by a pin.

24. The header as defined by claim 23 wherein the second position of the wheels is a gauge wheel position wherein the wheels support the ends of the header during harvesting.

25. The header as defined by claim 24 further comprising an elongated trailer tongue carried by the main frame for movement between a retracted, stowed position and a transport position in which a portion of the tongue extends outward beyond one end of the frame for attachment to a towing vehicle and one or more pins holding the trailer tongue in the retracted, stowed position and in the transport position.

* * * * *